D. H. MOSTELLER.
WATER BICYCLE.
APPLICATION FILED APR. 27, 1912.
1,072,027.
Patented Sept. 2, 1913.
3 SHEETS—SHEET 1.
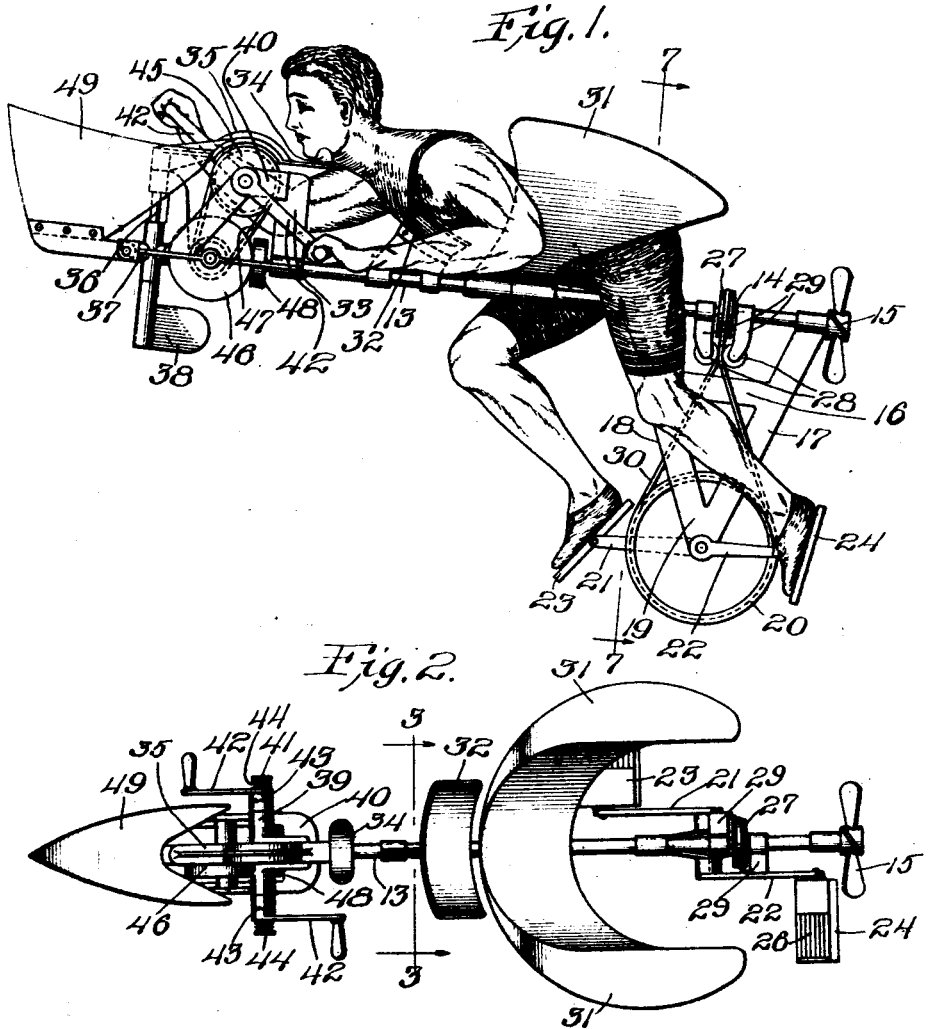
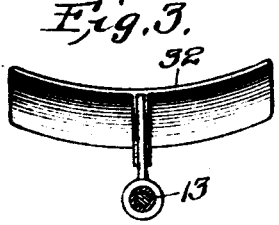
Witnesses:
Harry S. Gaither
Walter Hoeltje
Inventor:
Dozier H. Mosteller
by Walker Browning
Atty D. H. MOSTELLER.
WATER BICYCLE.
APPLICATION FILED APR. 27, 1912.
1,072,027.
Patented Sept. 2, 1913.
3 SHEETS—SHEET 2.
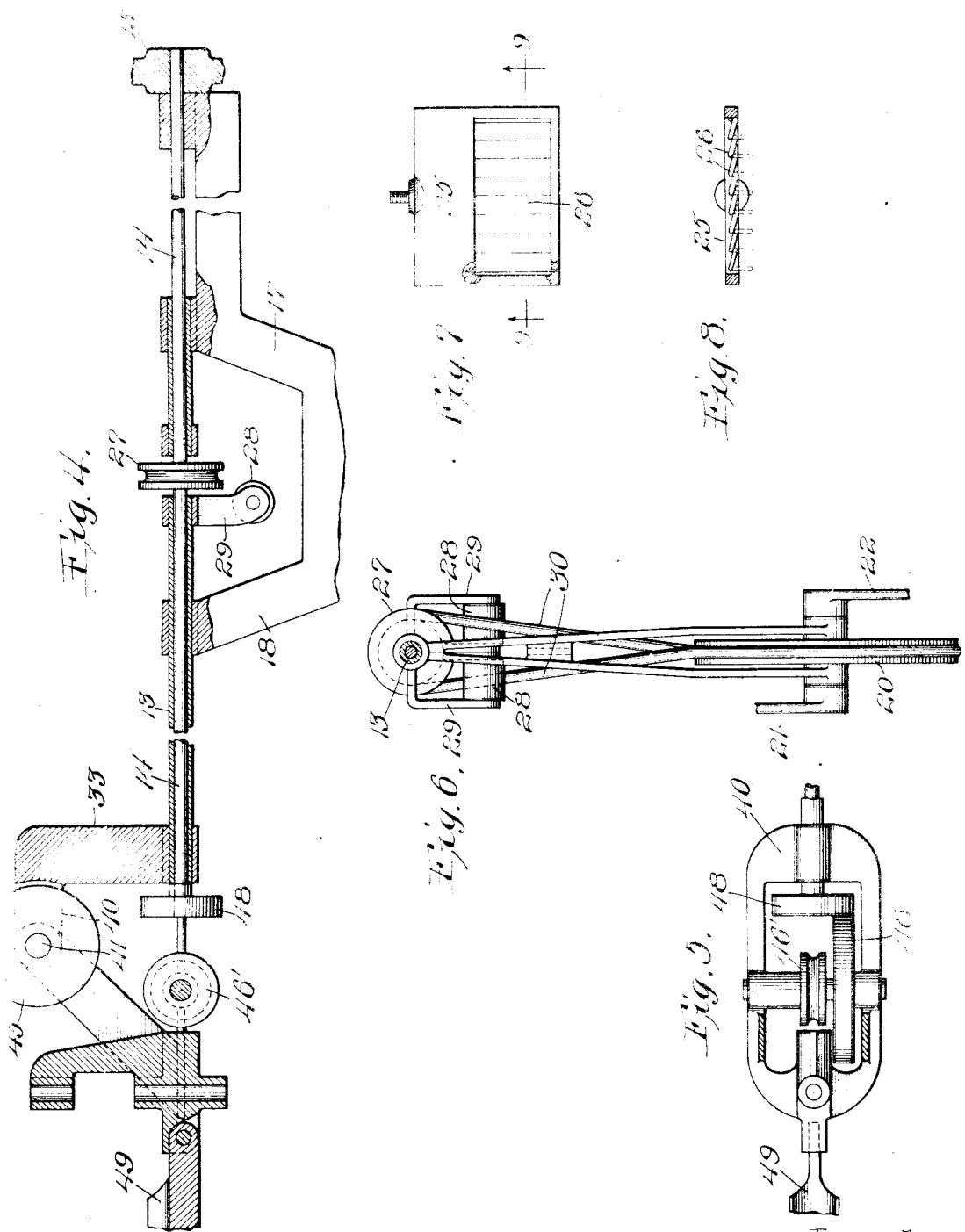
Witnesses:
Harry S. Gaither
Walter Hoeltje
Inventor:
Dosier H. Mosteller
by
Atty D. H. MOSTELLER.
WATER BICYCLE.
APPLICATION FILED APR. 27, 1912.
1,072,027.
Patented Sept. 2, 1913.
3 SHEETS—SHEET 3.
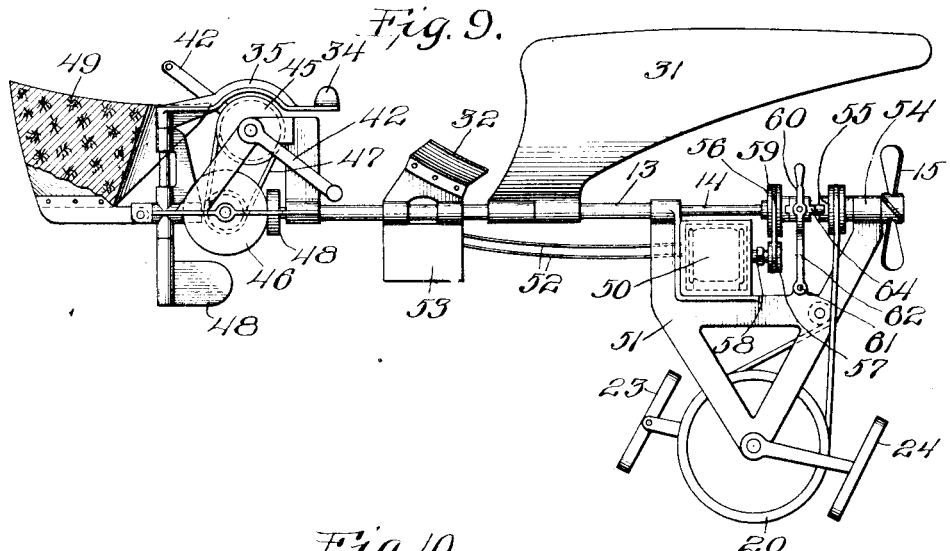
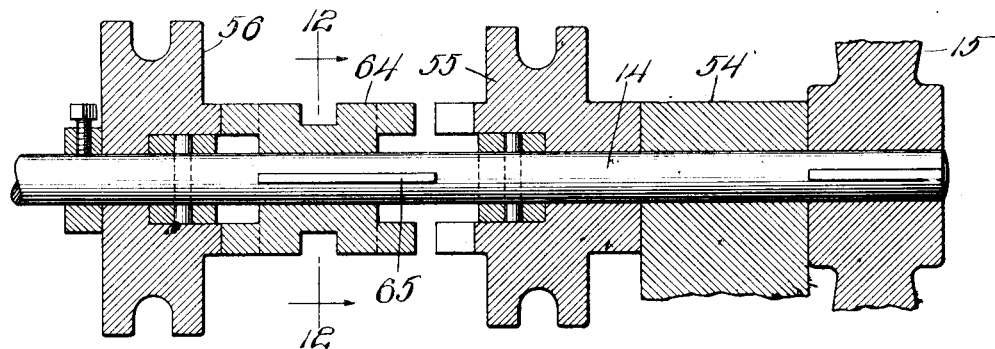
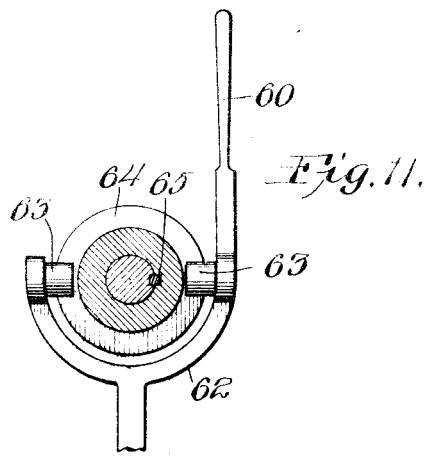
Witnesses:
Harry S. Gaither
Walter Hoettje
Inventor:
Dosier H. Mosteller
by ........
Atty

UNITED STATES PATENT OFFICE.

DOSIER H. MOSTELLER, OF CHICAGO, ILLINOIS.

WATER-BICYCLE.

1,072,027.  Specification of Letters Patent.  Patented Sept. 2, 1913.

Application filed April 27, 1912. Serial No. 693,535.

*To all whom it may concern:*

Be it known that I, DOSIER H. MOSTELLER, a citizen of the United States, residing at Chicago, in the county of Cook and State of Illinois, have invented certain new and useful Improvements in Water-Bicycles, of which the following is a specification.

This invention relates to water bicycles; and has for its essential object to produce a device capable of being actuated by one or more persons; and for causing the bicycle to travel at the desired speed upon and over the water.

Another object of the invention is to construct the device in a durable, efficient and economical manner, eliminating unnecessary weight; to maintain the requisite buoyancy and balance of the water bicycle; to the means for driving or propelling the bicycle by hand, or foot power, or otherwise; and the invention further consists in the features of construction and combination of parts hereinafter described and claimed.

In the drawings, Figure 1 is a side elevation showing the water bicycle in use and operation; Fig. 2 is a top or plan view thereof; Fig. 3 is a cross section, taken on line 3—3 of Fig. 2; Fig. 4 is a longitudinal section taken through the bicycle frame; Fig. 5 is a detail plan view of the hand driving mechanism; Fig. 6 is a cross section taken on line 7—7 of Fig. 1; Fig. 7 is a detail showing one of the foot pedals in elevation; Fig. 8 is a cross section taken on line 9—9 of Fig. 7; Fig. 9 is a side elevation of the bicycle equipped with modified propelling means; Fig. 10 is a longitudinal section taken through the rear of the main driving shaft; and Fig. 11 is a cross section taken on line 12—12 of Fig. 10.

This improved water bicycle preferably comprises a longitudinal frame 13 made of aluminum, or other metal, and is shown as of tubular formation, carrying an elongated driving shaft 14 extending somewhat rearwardly thereof, to which may be attached a propeller 15.

As indicated in Fig. 1, a wheel frame 16 is attached to the rear of the frame 13 comprising diverging frame arms 17 and 18 merging together at 19 for carrying a driving wheel 20, adjacent which are opposite pedal cranks 21 and 22 carrying pedals 23 and 24, of any approved construction. In Figs. 8 and 9, said pedals are shown as partially formed with a body section 25, having adjacent thereto a series of movable plates or vanes 26 pivotally secured transversely thereof for minimizing water impact as the pedals are moved, but, if desired, these movable plates or vanes may extend entirely across the pedals, or otherwise, as desired. A shaft wheel 27 is secured to the driving shaft 14 intermediate guide rollers 28 carried by frame arms 29, and a belt 30 is shown in peripheral engagement with both the driving wheel 20 and the opposite guide rollers 28 which cause the belt to travel laterally over the shaft wheel 27 for communicating power from the pedals through the driving wheel to the shaft for actuating the propeller. A pair of outwardly supporting wings or sustaining members 31 are shown attached to the frame, and are preferably movably mounted thereupon for being raised into the upright position, shown in Fig. 1, adjacent the sides of the operator for balancing and giving additional buoyancy to the bicycle. These side wings 31 may be made of cork, aluminum, or other material, having the requisite strength and buoyancy to maintain the device in operative position, and may be of any suitable formation, such as aluminum air tanks, or otherwise. In front of these supporting frame wings 31 a curved breast plate 32 may be used, if desired, for sustaining and forming a body rest for the operator when he is leaning forward, as in Fig. 1. Adjacent this breast plate 32 may be an upright frame 33 attached to the bicycle body which may carry at its upper end a chin guide 34 mounted on a plate 35 secured at its opposite end to a depending rod 36 rotatably mounted, as at 37, within the frame for actuating a depending rudder 38. Obviously, this steering construction may be modified to suit particular requirements, but it is preferred to have a chin control when the operator's hands are employed in propelling the main driving shaft.

Referring to Fig. 2, a transverse casing 39 is carried on a frame 40, and within said casing is a shaft 41, to which hand cranks 42 may be secured, the inner ends 43 of said hand cranks being provided with toothed collars normally engaging opposite coöperating teeth formed in the casing 39, it being understood that springs 44 upon the opposite ends of the shaft 41 normally maintain the hand cranks 42 in operative engagement with the casing for rotating a driving wheel 45 centrally mounted thereupon, and a lower power wheel 46 is journaled to the main frame adapted to actuate a wheel 46' keyed onto the same shaft, and a belt 47 is in peripheral engagement with said upper and lower power wheels 45 and 46, respectively, the wheel 46' contacting a shaft wheel 48 upon the driving shaft for imparting motion thereto and rotating the same as the hand cranks 42 are actuated by the operator. Obviously, other hand propelling means may be used for the same purpose, but it is preferred to have a construction which will permit of the hand cranks being thrown into and out of operative engagement with the driving mechanism as desired, in order that the operator may use both his hands and feet at the same time for propelling the bicycle, or his hands or feet alone.

As shown, the front of the bicycle frame carries an upright converging bow 49 of any desirable formation, and may be made of aluminum, cork, or other material. If desired, aluminum tanks, or other sustaining means may be used in this connection for producing a proper balance and position of the bicycle when in operation, and it is accordingly not intended to limit the construction to the formation shown.

Other means may be used for driving or propelling the water bicycle, and any suitable gasolene or electric motor may be employed. Referring to Fig. 10, a motor 50 is positioned within a frame 51 and connected by wires 52 to batteries 53 within a waterproof box or receptacle attached to the main frame, or otherwise. The propeller 15 is shown attached to the rear of the driving shaft 14 which is secured within frame bearings 54, said driving shaft carrying shaft wheels 55 and 56, respectively. Immediately beneath the shaft wheel 56 is a driving wheel 57 keyed to a motor shaft 58 and a belt 59 peripherally engages the driving and driven wheels 57 and 56 for rotating the main driving shaft 14. A clutch controlling lever 60 is shown pivoted at 61 to the depending frame section 51, as in Fig. 10. Its upper portion may be formed, as in Fig. 12, comprising a yoke 62 having inwardly projecting studs 63 engaging a clutch block 64, which is movable longitudinally upon a spline 65 on the driving shaft. The clutch block 64 is shown having opposite projecting shoulders for engagement with the slotted sleeves of the shaft wheels on either side thereof, and in Fig. 10, the clutch lever 60 is shown positioned for engaging the shaft wheel 56 for enabling the shaft to be driven by motor power. When the clutch controlling lever is moved rearwardly away from the shaft pulley 56, the driving shaft 14 may be rotated by hand power, and when said clutch block 64 engages the sleeve of the rear shaft wheel 55 connection is effected for driving the shaft by foot power. When the motor is not in use, the connection may be broken between shafts 54 and 58, for permitting the bicycle to be propelled by foot power alone, and the device may be propelled jointly by hand and foot power by throwing the clutch block into engagement with the stub shaft irrespective of the operation of the motor.

The driving and propelling mechanism of the device may, of course, be varied considerably in its construction without departing from the spirit of the invention, and it is accordingly not intended to limit the same to the construction herein shown and described. Moreover, any practical construction is contemplated for maintaining lateral and longitudinal balance or buoyancy of the device.

I claim:

1. In a water bicycle, a frame, a driving shaft carried by the frame, a propeller driven by the driving shaft, means for actuating the driving shaft for rotating the propeller, means for maintaining the proper buoyancy and balance of the bicycle, and a chin member for directing its course of travel, substantially as described.

2. In a water bicycle, a frame, a driving shaft carried by the frame, a propeller driven by the driving shaft, a driving wheel provided with foot cranks and pedals for driving said wheel, a shaft wheel above the driving wheel, a belt peripherally engaging the driving wheel and shaft wheel for imparting motion to the driving shaft for rotating the propeller, means for maintaining proper buoyancy and balance of the bicycle, and a chin control adapted to actuate a rudder by movement of the operator's chin, substantially as described.

3. In a water bicycle, a bicycle frame, a driving shaft carried by the frame, a propeller driven by the driving shaft, means for rotating the driving shaft by hand power, means for rotating the driving shaft by foot power, means for maintaining proper buoyancy and balance of the bicycle, and a steering chin control for actuating a rudder by means of movement imparted from the operator's chin, substantially as described.

4. In a water bicycle, a bicycle frame, a driving shaft carried by the frame, a propeller driven by the driving shaft, a driving wheel secured to said frame, foot cranks and pedals for actuating said driving wheel, a driven shaft wheel above the driving wheel, a belt peripherally engaging said driving and driven wheels, guide rollers for transforming the position of travel of said belt, movable sustaining members secured to the frame and adapted when in use to be raised adjacent the operator's body, means for rotating the driving shaft by hand power, a body rest secured to the frame, and steering means for directing its course of travel, substantially as described.

5. In a water bicycle, a bicycle frame, a driving shaft carried by the frame, a propeller driven by the driving shaft, a driving wheel secured to said frame, foot cranks and pedals for actuating said driving wheel, a driven shaft wheel above the driving wheel, a belt peripherally engaging said driving and driven wheels, guide rollers for transforming the position of travel of said belt, movable sustaining members secured to the frame and adapted when in use to be raised adjacent the operator's body, means for rotating the driving shaft by hand power, a body rest secured to the frame, and steering means comprising a chin controlling member for actuating the rudder, substantially as described.

6. In a water bicycle, a bicycle frame, a driving shaft carried by the frame, a propeller driven by the driving shaft, a driving wheel mounted in said frame, foot cranks and pedals for actuating said driving wheel, a shaft wheel above said driving wheel, means for imparting motion from said driving to said driven wheel, means for rotating the driving shaft by hand power, comprising hand cranks normally in engaging operative position, but adapted to be disengaged when desired, means for maintaining the proper buoyancy and balance of the bicycle, and a steering chin control for actuating a rudder by means of movement imparted from the operator's chin, substantially as described.

DOSIER H. MOSTELLER.

Witnesses:
WALKER BANNING,
CLARA LOUISE BANNING.